US012572761B2

(12) United States Patent
Peternel et al.

(10) Patent No.: US 12,572,761 B2
(45) Date of Patent: *Mar. 10, 2026

(54) SYSTEMS AND METHODS FOR IDENTIFYING A RADIO FREQUENCY IDENTIFICATION TAG

(71) Applicant: Intermec IP Corporation, Charlotte, NC (US)

(72) Inventors: James Peternel, Edmonds, WA (US); Shashidhar Ramamurthy, Seattle, WA (US)

(73) Assignee: Intermec IP Corporation, Charlotte, NC (US)

( * ) Notice: Subject to any disclaimer, the term of this patent is extended or adjusted under 35 U.S.C. 154(b) by 131 days.

This patent is subject to a terminal disclaimer.

(21) Appl. No.: 18/526,896

(22) Filed: Dec. 1, 2023

(65) Prior Publication Data

US 2024/0095471 A1 Mar. 21, 2024

Related U.S. Application Data

(63) Continuation of application No. 17/325,915, filed on May 20, 2021, now Pat. No. 11,880,736.

(60) Provisional application No. 63/030,386, filed on May 27, 2020.

(51) Int. Cl.
*G06K 7/10* (2006.01)
*G06K 19/07* (2006.01)

(52) U.S. Cl.
CPC ..... *G06K 7/10099* (2013.01); *G06K 7/10356* (2013.01); *G06K 19/0724* (2013.01)

(58) Field of Classification Search
None
See application file for complete search history.

(56) References Cited

U.S. PATENT DOCUMENTS

| | | | |
|---|---|---|---|
| 7,187,288 B2 | 3/2007 | Mendolia et al. | |
| 7,808,367 B2 | 10/2010 | Moore | |
| 8,395,482 B2 | 3/2013 | Sadr et al. | |

(Continued)

FOREIGN PATENT DOCUMENTS

WO 2012/047559 A2 4/2012

OTHER PUBLICATIONS

Decision to grant a European patent Mailed on Aug. 22, 2024 for EP Application No. 21175825, 2 page(s).

(Continued)

*Primary Examiner* — John F Mortell
(74) *Attorney, Agent, or Firm* — Alston & Bird LLP

(57) ABSTRACT

Various embodiments of the present disclosure identify radio frequency identification tag(s) and/or location(s) thereof. Embodiments may perform such identification utilizing any number of antennas configured at various power levels and/or frequency channels, such as by incrementing and/or decrementing the power level of each antenna and measuring a number of tag reads at interval for each antenna. Confidence scores for each antenna may be generated and compared. Some example embodiments initiate an interrogation command associated with a RFID tag, cause activation of a plurality of antennas at a plurality of transmit power levels, identify a count of tag reads associated with each antenna, and determine a tag location associated with the RFID tag based on the count of tag reads for each antenna.

20 Claims, 5 Drawing Sheets

(56) References Cited

U.S. PATENT DOCUMENTS

| 8,519,823 | B2 | 8/2013 | Rinkes |
| 10,185,849 | B2 | 1/2019 | Martinez et al. |
| 10,242,393 | B1 | 3/2019 | Kumar et al. |
| 10,339,493 | B1 | 7/2019 | Famularo et al. |
| 10,586,082 | B1 | 3/2020 | Tang et al. |
| 11,030,541 | B1 | 6/2021 | Camp et al. |
| 2005/0280508 | A1 | 12/2005 | Mravca et al. |
| 2006/0176152 | A1 | 8/2006 | Wagner et al. |
| 2006/0267730 | A1 | 11/2006 | Steinke et al. |
| 2006/0284727 | A1 | 12/2006 | Steinke |
| 2007/0008129 | A1* | 1/2007 | Soliman ............... G01S 5/0289 340/572.1 |
| 2007/0265799 | A1 | 11/2007 | Yamada |
| 2008/0100439 | A1 | 5/2008 | Rinkes |
| 2008/0280560 | A1 | 11/2008 | Tuttle |
| 2010/0039228 | A1 | 2/2010 | Sadr et al. |
| 2010/0148985 | A1 | 6/2010 | Lin et al. |
| 2010/0201520 | A1 | 8/2010 | Stern et al. |
| 2011/0050421 | A1 | 3/2011 | Duron et al. |
| 2014/0306804 | A1 | 10/2014 | Stiefel et al. |
| 2014/0306808 | A1 | 10/2014 | Jones et al. |
| 2014/0361077 | A1 | 12/2014 | Davidson |
| 2014/0361078 | A1* | 12/2014 | Davidson ........... G06K 7/10475 29/601 |
| 2016/0224814 | A1* | 8/2016 | Stiefel .................. G06Q 10/087 |
| 2017/0193779 | A1 | 7/2017 | Langer et al. |
| 2019/0392274 | A1 | 12/2019 | Louzir et al. |

OTHER PUBLICATIONS

European search report Mailed on Oct. 18, 2024 for EP Application No. 24187235, 8 page(s).

EP Office Action Mailed on Mar. 28, 2023 for EP Application No. 21175825, 5 page(s).

European search report Mailed on Oct. 21, 2021 for EP Application No. 21175825, 8 page(s).

Non-Final Rejection Mailed on May 17, 2023 for U.S. Appl. No. 17/325,915, 7 page(s).

Notice of Allowance and Fees Due (PTOL-85) Mailed on Aug. 30, 2023 for U.S. Appl. No. 17/325,915, 7 page(s).

EP Office Action Mailed on Nov. 17, 2025 for EP Application No. 24187235, 4 page(s).

* cited by examiner

SYSTEMS AND METHODS FOR IDENTIFYING A RADIO FREQUENCY IDENTIFICATION TAG

CROSS REFERENCE TO RELATED APPLICATIONS

This application is a continuation of U.S. application Ser. No. 17/325,915, entitled "SYSTEMS AND METHODS FOR IDENTIFYING A RADIO FREQUENCY IDENTIFICATION TAG," filed May 20, 2021, which claims priority to Provisional Application No. 63/030,386, filed May 27, 2020, the contents of which are incorporated herein by reference in their entireties

TECHNOLOGICAL FIELD

Exemplary embodiments of the present disclosure relate generally to identifying a radio frequency identification (RFID) tag, more particularly, to methods and systems for determining a location of the RFID tag amongst a plurality of RFID tags.

BACKGROUND

A typical RFID system may be at least used in a material handling environment (e.g. a distribution center, a warehouse etc.) for tracking assets (e.g., but not limited to, articles, items, packages, shipments, boxes, etc.). In some examples, one or more RFID tags may be placed or attached to one or more assets that are to be tracked. In some examples, these assets may be located on various predefined storage locations (e.g., but not limited to, shelves of a storage location) within the material handling environment. Further, in some examples, the RFID system may include a distributed antennas set-up, i.e. an antenna configuration including multiple RFID antennas that may be installed at various locations. In some examples, these antennas may be communicatively coupled to one or more RFID readers and can be used to communicate RF interrogation signals received from the readers to the RFID tags for tracking the assets. In some examples, the RFID antennas and the one or more RFID readers may be connected over a distributed communication network. In some examples, the one or more RFID readers may be configured to read via the multiple RFID antennas, the one or more RFID tags (placed on the one or more assets) either continuously or periodically, thereby, tracking the assets.

BRIEF SUMMARY

In general, embodiments of the present disclosure provided herein identify RFID tags and/or locations associated therewith. Conventional methodologies fail to accurately identify such RFID tags and/or locations associated therewith. Other implementations for identifying RFID tags and/or locations associated therewith will be, or will become, apparent to one with skill in the art upon examination of the following figures and detailed description. It is intended that all such additional implementations be included within this description, be included within the scope of the disclosure, and be protected by the following claims.

In accordance with a first aspect of the disclosure, a computer-implemented method is provided. The computer-implemented method is implementable via any of a myriad of computing devices embodied in hardware, software, firmware, and/or any combination thereof as described herein. In one example embodiment of the computer-implemented method, the example computer-implemented method comprises initiating an interrogation command associated with a RFID tag. The example computer-implemented method further comprises causing activation of a plurality of antennas at a plurality of transmit power levels. The example computer-implemented method further comprises identifying a count of tag reads associated with each antenna of the plurality of antennas. The example computer-implemented method further comprises generating a plurality of confidence scores comprising a confidence score for each antenna based at least in part on the count of tag reads associated with each antenna. The example computer-implemented method further comprises determining a tag location associated with the RFID tag based at least in part on the plurality of confidence scores.

In some embodiments of the example computer-implemented method, causing activation of the plurality of antennas at the plurality of transmit power levels, comprises sequentially activating the plurality of antennas at the plurality of transmit power levels.

In some embodiments of the example computer-implemented method, causing activation of the plurality of antennas at the plurality of transmit power levels comprises activating each antenna of the plurality of antennas with a particular power level to a maximum transmit power level of the plurality of transmit power levels; and incrementally decreasing the particular power level of each antenna of the plurality of antennas until the particular power level reaches a minimum power level of the plurality of transmit power levels.

In some embodiments of the example computer-implemented method causing activation of the plurality of antennas at the plurality of transmit power levels comprises activating each antenna of the plurality of antennas with a particular power level to a minimum transmit power level of the plurality of transmit power levels; and incrementally increasing the particular power level of each antenna of the plurality of antennas until the particular power level reaches a maximum power level of the plurality of transmit power levels.

In some example embodiments of the example computer-implemented method, causing activation of the plurality of antennas at the plurality of transmit power levels comprises activating the plurality of antennas according to a binomial search operation.

In some example embodiments of the computer-implemented method, causing activation of the plurality of antennas at the plurality of transmit power levels occurs over a plurality of frequency channels. Additionally or alternatively, in some example embodiments of the computer-implemented method, the computer-implemented method further comprises selecting the plurality of frequency channels based on a set of frequency dwell times associated with the plurality of antennas.

In some example embodiments of the computer-implemented method, identifying the count of tag reads associated with each antenna of the plurality of antennas comprises identifying a set of count of tag reads comprising a sub-count of tag reads associated with each antenna of the plurality of antennas at a plurality of transmit power levels and a plurality of frequency channels.

In some example embodiments of the computer-implemented method, determining the confidence score for a particular antenna of the plurality of antennas comprises determining a plurality of weightage parameters comprising a weightage parameter corresponding to each transmit power level of the plurality of transmit power levels; and generating a plurality of values corresponding to the plurality of power levels, wherein the plurality of values comprises a value generated for each particular transmit power level of the plurality of power levels based at least in part on (1) the sub-count of tag reads associated with the antenna at the power level and each frequency channel of the plurality of frequency channels, and (2) the weightage parameter corresponding to the particular transmit power level from the plurality of weightage parameters; and calculating the confidence score from the plurality of values corresponding to the plurality of power levels.

In some example embodiments of the computer-implemented method, the computer-implemented method further comprises triangulating the RFID tag based at least in part on signals received in response to activation of the plurality of antennas.

In some example embodiments of the computer-implemented method, the computer-implemented method further comprises randomly determining the plurality of frequency channels.

In some example embodiments of the computer-implemented method, the count of tag reads associated with each antenna of the plurality of antennas comprises, for each transmit power level of the plurality of transmit power levels, a sub-count of tag reads associated with each frequency of the plurality of frequency channels, and generating a confidence score for a particular antenna of the plurality of antennas comprises determining a plurality of first weightage parameters comprising a weightage parameter corresponding to each transmit power level of the plurality of transmit power levels; determining a plurality of second weightage parameters comprising a weightage parameter corresponding to each frequency channel of the plurality of frequency channels; generating a plurality of values corresponding to the plurality of power levels and the plurality of frequency channels, wherein the plurality of values comprises a value generated for each particular transmit power level of the plurality of power levels and each particular frequency channel of the plurality of frequency channels based at least in part on: for each transmit power level of the plurality of transmit power levels, the sub-count of tag reads associated with each frequency of the plurality of frequency channels; a first weightage parameter of the plurality of first weightage parameters; and the plurality of second weightage parameters corresponding to each frequency channel of the plurality of frequency channels; and calculating the confidence score from the plurality of values corresponding to the plurality of power levels and the plurality of frequency channels.

In some example embodiments of the computer-implemented method, generating the confidence score for a particular antenna of the plurality of antennas comprises executing a summation of the count of tag reads corresponding to the particular antenna for each transmit power level of the plurality of transmit power levels.

In accordance with another aspect of the disclosure, an apparatus is provided. In some example embodiments, the apparatus comprises at least one processor and at least one memory having computer-coded instructions stored thereon. The computer-coded instructions, in execution via the at least one processor, configure the apparatus to perform any one of the computer-implemented methods described herein. In other embodiments of the apparatus, the apparatus comprises means for performing each step of any one of the computer-implemented methods described herein.

In accordance with yet another aspect of the disclosure, a computer program product is provided. In some example embodiments, the computer program product comprises at least one non-transitory computer-readable storage medium having computer program code stored thereon. The computer program product, in execution with at least one processor, is configured for performing any one of the example computer-implemented methods described herein.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
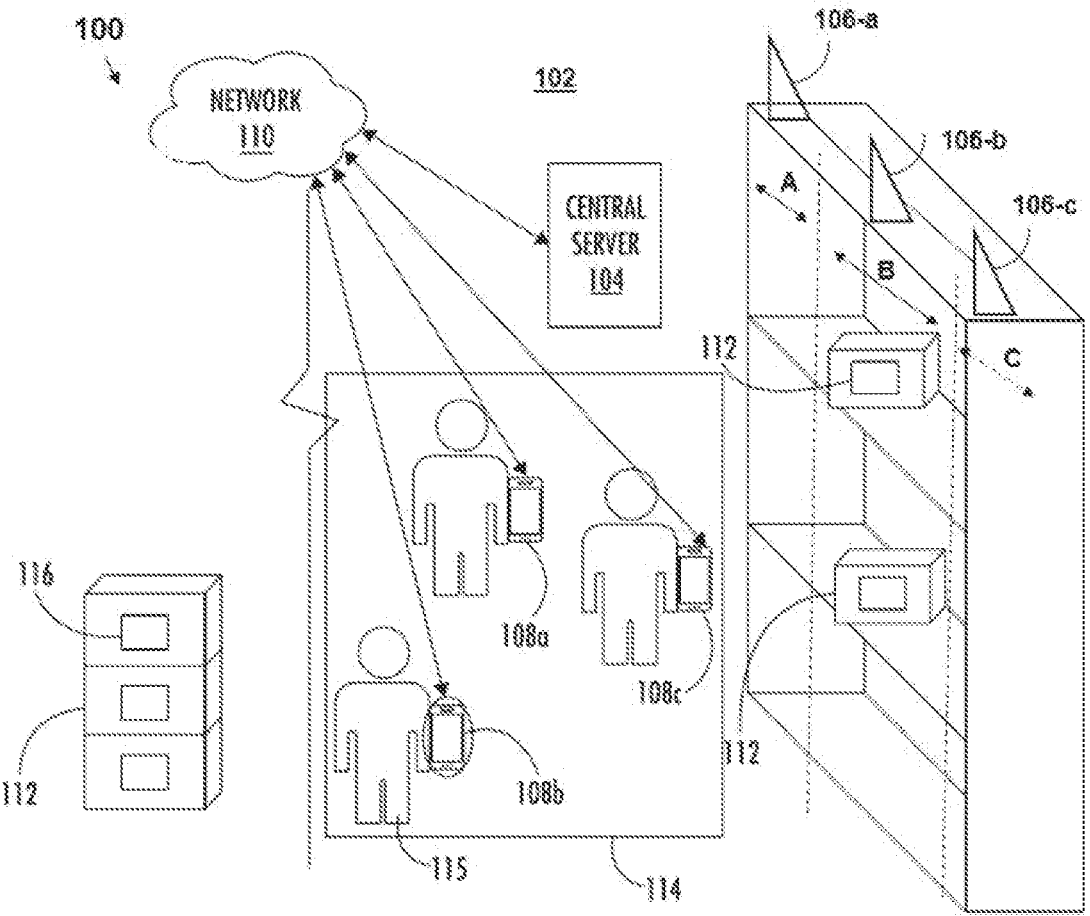
FIG. 1 illustrates an exemplary environment depicting an environment comprising a radio frequency identification (RFID) system, according to one or more embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

The term "comprising" means including but not limited to and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," and the like generally mean that the particular feature, structure, or characteristic following the phrase may be included in at least one embodiment of the present disclosure, or may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "radio frequency (RF) tag" is used herein to correspond to an electronic component that transmits or receives information or date via an antenna. In some examples, the RFID tag includes an integrated circuit (IC), an antenna element, and a substrate. In an example embodiment, the antenna element can be fabricated on the substrate and the IC can be attached to the substrate. Further, the IC can be communicatively coupled to the antenna element through an interconnect on the substrate. In an example embodiment, the integrated circuit in the RFID tag can be configured to store encoded information or encoded data. In some examples the RFID tag can be configured to operate in various RF frequency bands such as, but not limited to, 13.56 MHz (hereinafter High Frequency Band) or 860 MHz-960 MHz (UHF band). In some example embodiments, the RFID tag can have a dedicated power source that can enable the RFID tag to communicate with one or more components, such as an RF encoder and an RF reader. Such RFID tags are referred to as active RFID tags.

In alternative example embodiments, the RFID tag may not have a dedicated power source. In such embodiments, the RFID tag can have a power coupler that can be capable of inducing electrical charge when the RFID tag is brought in an RF field. The induced electrical charge is thereafter used to power the RFID tag, itself.

In some example embodiments, an environment (e.g., but not limited to, a warehouse, an inventory, a distribution center, a material handling environment, a logistics transport carrier, and/or the like) may include a distributed antenna network set-up having a plurality of RFID antennas that may installed at various locations. Further, the environment may also include one or more RFID readers that may communicate with one or more of the plurality of RFID antennas to interrogate RFID tags. In some examples, an RFID tag may be associated with an asset (e.g. a shipment, a cart, a package, an item, a product, etc.) to track and identify the asset within the environment. Such environments may include an RFID system configuration having distributed RF antennas. Typically, distributed antenna systems are used in the wireless field for many applications (e.g., to boost broadband mobile wireless coverage). For example, distributed antenna systems may include many antennas tuned to match the area, such as of a building or venue or an area of a storage location (e.g. inventory) where increased signal strength or a boosted service is desired or needed. Usually, in order to use RFID technology in a distributed antenna system environment, multiple readers or multiple antenna multiplexers (controllers), controller devices (e.g., readers and/or multiplexers) and coaxial cables can be used. Said that, some example embodiments described herein relates to an RFID system having such configuration of the distributed antennas that may operate over RF and may be installed in the industrial environment (e.g. a warehouse) to identify RF tags associated with assets.

According to an example environment, an RFID tag can be associated to each asset stored in a warehouse. To this end, in some cases, to locate an asset from amongst multiple assets in the warehouse, a worker may use an RFID reader (e.g., but not limited to, of a portable data terminal—"PDT") to interrogate the RFID tag associated with the asset. Said that, in such environment, it is desired to reduce an amount of time spent by the worker in locating the asset to improve overall worker productivity and increase throughput. In some examples, for locating the asset, the worker may reach an approximate storage location, however, may still need to search through all of these assets to find a desired asset box.

Typically, for locating and tracking assets in such environment, the RFID tags associated with the assets are interrogated by the RFID reader used by the worker. In some examples, the environment may include high powered RF systems where active RFID tags may be associated with assets for tracking purposes. In this regard, RF parameters associated with RFID reader and RFID tags (such as, but not limited to, signal strength associated with RF interrogation signals and phase angle) can be used to locate a desired RFID tag from amongst the multiple RFID tags associated with respective assets. However, active RFID tags are generally costly hence, usually, passive RFID tags are used with assets for asset tracking. In such cases, using the signal strength and phase angle related RF parameters for detecting desired passive RFID tag is ineffective and has associated limitations, due to various factors, for instance, weak RF signal values. Further, using the RFID reader to interrogate RFID tags associated with assets for tracking packages in a confined environment becomes more challenging, in instances, where the environment includes many metallic surfaces (e.g. of shelves in a warehouse etc.) due to presence of RF reflection and noise that impacts the performance of overall RFID system. Furthermore, at times, finding a location of the RFID tag associated with an asset in a confined environment involves manual intervention, which is challenging and impacts productivity.

Various example embodiments described herein relates to an RFID system for identifying an RFID tag, for example, from amongst multiple RFID tags. By way of implementation of some example embodiments described herein, an approximate location of a desired RFID tag within an environment can be identified by the RFID system. In some example embodiments, the RFID system can comprise, an RFID reader, an array of antennas that can be installed at various locations within an area, and a plurality of RFID tags associated with respective assets. In some example embodiments, the RFID reader of the RFID system may be configured to detect an approximate location of a desired RFID tag in an area.

In some example embodiments, the RFID reader of the RFID system may be configured to sequentially power each antenna of the array of antennas array located in the area. In this regard, sequentially powering the antennas may include powering up by the RFID reader, one antenna at an instance of time, a next antenna at a next time instance, and so on. Said that, in some example embodiments, the RFID system may be configured to vary a transmitted level of power (e.g., a "transmit power") at which a radio transceiver of the RFID reader can be operated. In some example embodiments, in response to sequentially powering each antenna, the RFID reader can be configured to gradually decrease the power of each antenna to identify the antenna that last read the RFID tag. In this aspect, the approximate location of desired RFID tag can be identified from the location of antenna that last read the tag, further details of which are described later in the description.

In some example embodiments, the RFID system may be configured to utilize a binomial search to locate an antenna that may be closest to desired RFID tag. In this regard, the RFID system may utilize a user-defined minimum power level and a user-defined maximum power level to which the antennas may be powered. Further, the RFID reader of the RFID system may sequentially power each antenna at a full power level and may further gradually decrease the power until none of the antennas from amongst the array of antennas read the tag. The approximate location of the tag can be identified from the location of the antenna that last read the tag, further details of which are described later in the description.

Further, in some example embodiments, the RFID system may identify the approximate location of the RFID tag in the area, by sequentially powering each antenna of an antenna array located in the area, over various frequency channels. In this regard, in some examples, the RFID system may determine the frequency channels based on a pre-defined rule. Further, in response to sequentially powering each antenna over the various frequency channels, the RFID system may gradually decrease the power of each antenna and continue to power antennas over various frequency channels. To this end, in some example embodiments, the RFID system may compute a confidence score for each antenna which can be used to identify the approximate location of the RFID tag in the area. For instance, in some example embodiments, the approximate location of the RFID tag can be identified by determining the antenna with highest confidence value. In some example embodiments, the confidence value can be determined based on read count and weightage of respective read count, details of which are described later in the description.

By identifying an RFID tag and/or corresponding location associated with the RFID tag as described, embodiments eliminate the requirement that a user manually extensively search for such an RFID tag and/or corresponding asset. Additionally or alternatively, such RFID tags may be tracked as they transverse throughout an environment. Additionally or alternatively still, particular aspects of embodiments described herein, such as the use of a plurality of power levels and/or frequency channels, increases the accuracy of the determinations described herein. Additionally or alternatively, other aspects, such as the use of confidence scores determined as described herein, further improve the accuracy of the determinations described herein. In this regard, the embodiments describe herein utilize particular, specially-configured computing system implementations to provide these technical improvements within the field of RFID tag identification and/or location determination.

FIG. 1 illustrates an exemplary environment 100 comprising a radio frequency identification (RFID) system 102, according to one or more embodiments described herein. In some example embodiments, the environment 100 may correspond to an industrial environment (e.g., but not limited to, a warehouse, a distribution center, an inventory, a shipping center, a transport carrier, a lorry, a logistic vehicle, a material handling site, and/or the like). In some example embodiments, the RFID system 102 can include a server 104, one or more antennas 106a, 106b, 106c . . . 106n (referred to as antennas 106 or array of antennas 106 interchangeably hereinafter for purpose of brevity), and one or more RFID readers 108a, 108b, . . . 108d (hereinafter referred to as RFID readers 108). In an example embodiment, the antennas 106 and the RFID readers 108 can be communicatively coupled to the server 104, through a network 110.

In some examples, the antennas 106 and any of the RFID readers 108 may facilitate tracking of the assets 112 transiting through the environment 100. In this regard, in some example embodiments, the assets 112 may be associated with encoded tags (e.g. RFID tag). In other words, in some examples, an RFID tag may be attached to each of the assets 112. In some example embodiments, the antennas 106 may communicate to one or more components of an asset tracking system 114. In some examples, the asset tracking system 114 may include any of the RFID readers 108 that may be used to interrogate encoded tags associated with assets for tracking the assets. In some examples, the RFID readers 108 can be handheld (e.g. a PDT device) that can be used by a worker 115. In some examples, the asset tracking system 114 may include one or more fixed or standalone type RFID readers. In accordance with some example embodiments, the RFID readers 108 may output RF signals to interrogate RFID tags associated with the assets 112. Any one or more of the RFID readers 108 may power the antennas 106 to interrogate RFID tags using RF signals. As illustrated, an RFID tag 116 may be associated with the asset 112. In some examples, the RFID tag may store encoded data or data in original form that can be used to identify and/or track the asset 112. In this regard, in some examples, to track the asset 112 in the RFID system 102, a worker such as the worker 115 may utilize one of the RFID readers 108, such as the RFID reader 108b, to retrieve the data from the tagged asset 116.

According to some example embodiments, each of the RFID readers 108 may include suitable logic and/or circuitry that may enable the RFID readers 108 to retrieve the encoded data from the RFID tags (e.g. the RFID tag 116) associated with the assets (e.g. the asset 116). In some examples, the RFID tag 116 may store encoded data such as a card number, a product identifier, SKU number, and/or the like, associated with the asset 116.

In some example embodiments, the antennas 106, as illustrated in FIG. 1, may correspond to a distributed antenna system that may be installed within the environment 100 (e.g. a warehouse). The distributed antenna system may represent a configuration of multiple antennas communicatively coupled via a communication circuitry, e.g. but not limited to, coaxial cables. Further, the antennas 106 in the distributed antenna system may be communicatively coupled to the RFID readers 108. In some example embodiments, one or more of the antennas 106 of the distributed antenna system may be sequentially powered up by any of the RFID readers 108. Further details of the distributed antenna system are described in reference to FIG. 4.

In some example embodiments, the environment 100 may correspond to a warehouse, a storage location, or an inventory location where each antenna of the antennas 106 may be installed over a respective column of a storage location in the environment 100. For instance, as illustrated, the environment 100 may include multiple columns (A, B, C . . . ) comprising portions of a plurality of shelves for storing the assets 112. In this regard, each antenna may be configured to communicate interrogation signals received from the RFID readers 108 to interrogate RFID tags associated with such assets which can be located in the respective column. In some examples, the RFID system 102 may include smart switches that can use a coaxial cable for both transmitting RF signals and control signals to the antennas 106 connected over the coaxial cable. In some example embodiments, the distributed antenna system may include the antennas 106 arranged in an array so as to cover a defined area (e.g. columns) that may contain the assets 112 (e.g. packages/ boxes). An example illustration of such a distributed antenna system is described in reference to FIG. 4.

Figure 2:
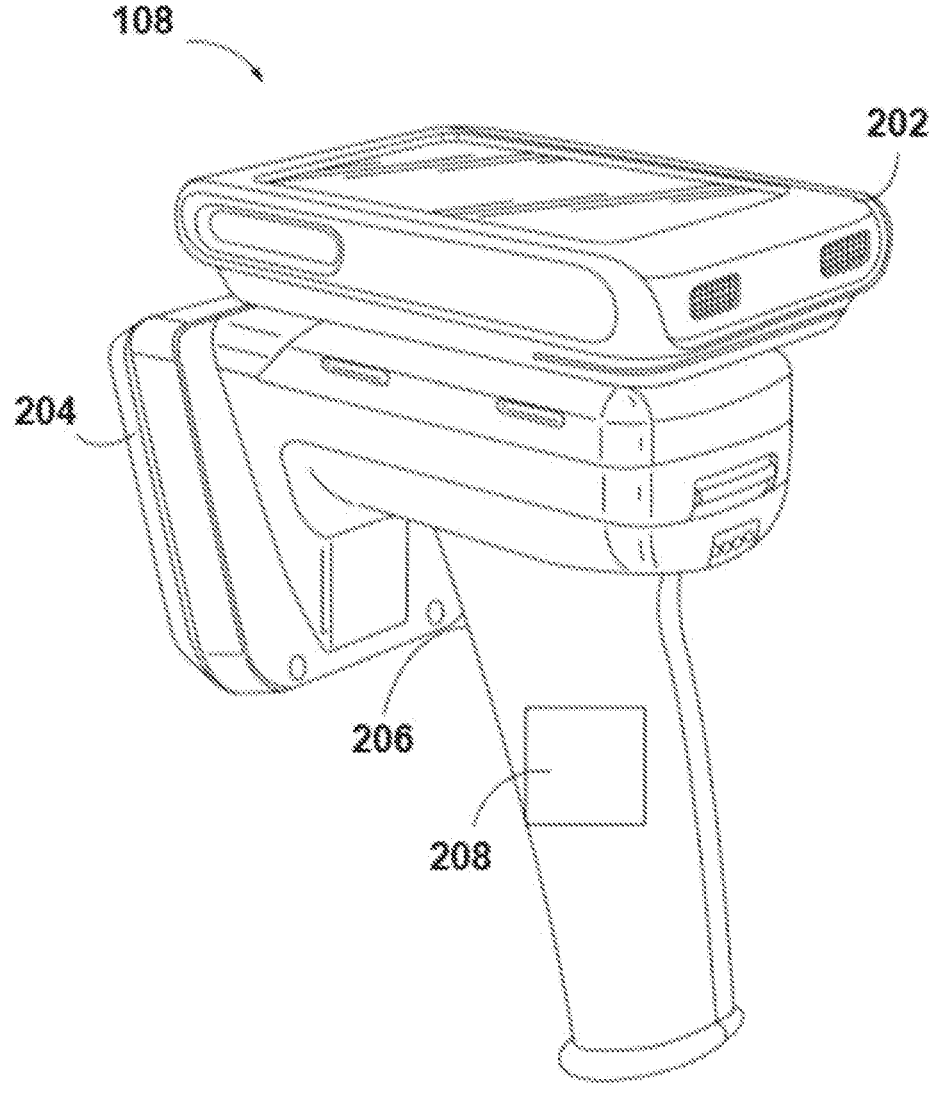
FIG. 2 illustrates an RFID reader of the RFID system, according to one or more embodiments described herein.

FIG. 2 illustrates an example apparatus implementation of one of the RFID readers 108, according to one or more embodiments described herein. In an example embodiment, the example implementation of one of the RFID readers 108 can include, a display screen 202, an RFID reader antenna 204, a trigger button 206, and an antenna powering system 208. In some examples, the display screen 202, the RFID reader antenna 204, and the antenna powering system 208 can be communicatively coupled with each other.

According to some example embodiments, the display screen 202 may include suitable logic, circuitry, interfaces, and/or code that may facilitate rendering or displaying of the content on the display screen 202. In an example embodiment, the display screen 202 may be realized through several known technologies such as, Cathode Ray Tube (CRT) based display, Liquid Crystal Display (LCD), Light Emitting Diode (LED) based display, Organic LED display technology, and Retina display technology. In some embodiments, the display screen 202 may further include a touch panel, such as a thermal touch panel, a capacitive touch panel, and/or a resistive touch panel, which may enable the workers, such as worker 115, to provide inputs to the implementation of the RFID readers 108.

In some example embodiments, the RFID reader antenna 204 can correspond to an active element that may be configured to generate RF signals when a voltage signal is applied at the antenna element. For example, the RFID reader antenna may be configured to generate the RF signal in HF frequency band. In another example, the RFID reader antenna may generate the RF signal in the UHF frequency band. Some examples of the antenna 204 may include, but are not limited to, Bow tie antenna, dipole antenna, monopole antenna, loop antenna, and/or the like.

According to some example embodiments, the trigger button 206 may include suitable logic and/or circuitry that may facilitate the worker 115 to provide input to one or more of the RFID readers 108, such as the RFID reader 108*b*. In an example embodiment, the trigger button 206 may either be an electro-mechanical button that may be configured to generate an electrical signal when the trigger button 206 is pressed. Further, the trigger button 206 may be communicatively coupled to the antenna powering system 208. In some example embodiments, the trigger button 206 may be a touch-sensitive button, or a gesture-based button.

According to some example embodiments, the antenna powering system 208 may include suitable logic and/or circuitry that may enable the RFID readers 102 to enable powering on of the antennas 106, as described in FIG. 1. Further, the antenna powering system 208 may also control one or more operations of any one of the RFID readers 108 and/or the antennas 106. In some examples, the RFID readers 102 may be configured to transmit via the RFID reader antenna 204, an interrogation signal to the RFID tag 116.

Figure 3:
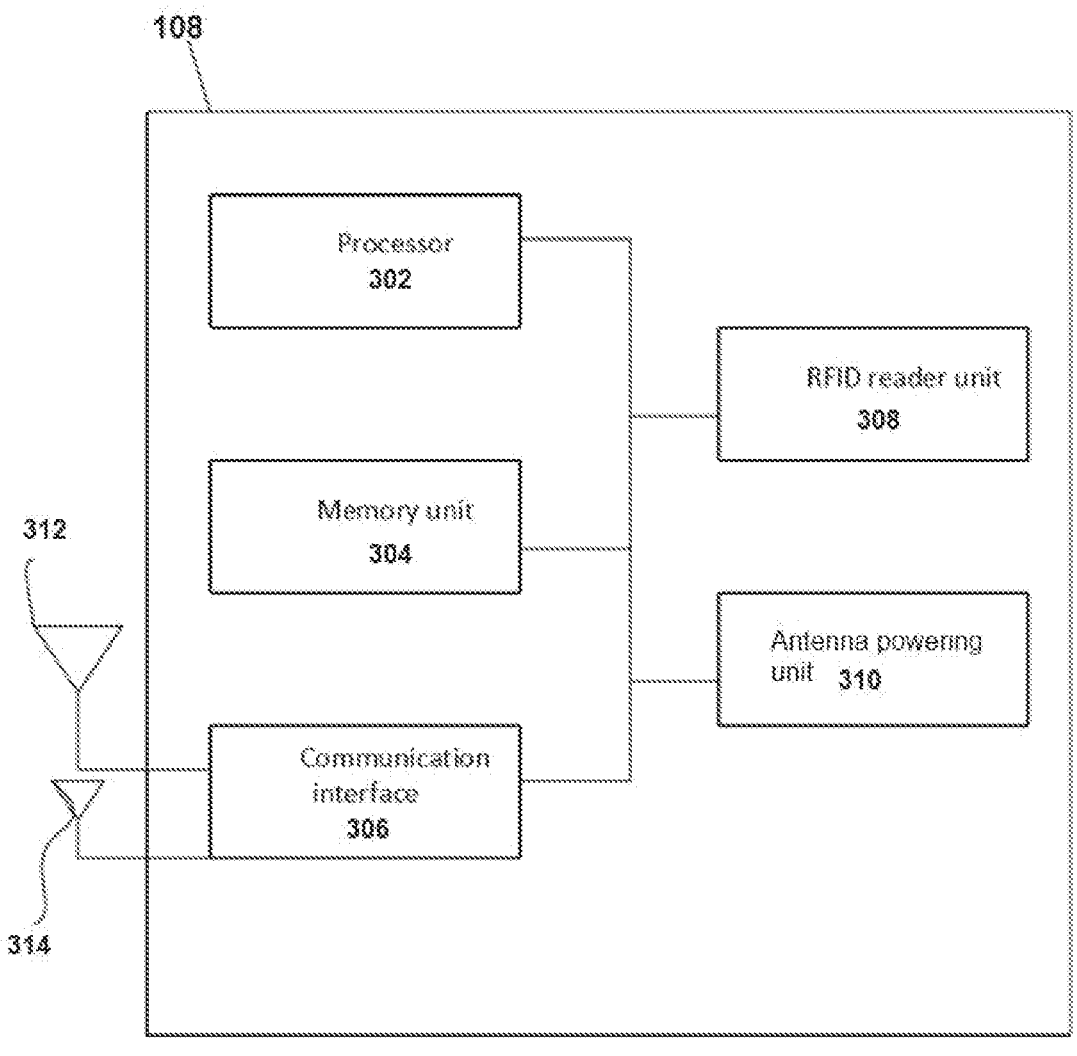
FIG. 3 illustrates a block diagram of the RFID reader, according to one or more embodiments described herein.

FIG. 3 illustrates a block diagram of the example implementation of the RFID readers 108, according to one or more embodiments described herein. The example implementation of the RFID readers 108 can include a processor 302, a memory unit 304, a communication interface 306, an RFID reader unit 308, an antenna powering unit 310, a first antenna element 312, and a second antenna element 314.

In some example embodiments, the processor 302 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 3 as a single processor, in an embodiment, the processor 302 may include a plurality of processors and signal processing modules. The plurality of processors may be embodied on a single electronic device or may be distributed across a plurality of electronic devices collectively configured to function as the circuitry of the example implementation of the RFID readers 108. In some examples, the plurality of processors may be in operative communication with each other and may be collectively configured to perform one or more functionalities of the circuitry of example implementation of the RFID readers 108, as described herein. In an example embodiment, the processor 302 may be configured to execute instructions stored in the memory unit 304 or otherwise accessible to the processor 302. According to various example embodiments described herein, these instructions, when executed by the processor 302, may cause the circuitry of the example implementation of the RFID readers 108 to perform one or more of the functionalities, as described herein.

Whether configured by hardware, firmware/software methods, or by a combination thereof, the processor 302 may include an entity capable of performing operations according to embodiments of the present disclosure while configured accordingly. Thus, for example, when the processor 302 is embodied as an ASIC, FPGA or the like, the processor 302 may include specifically configured hardware for conducting one or more operations described herein. Alternatively, as another example, when the processor 302 is embodied as an executor of instructions, such as may be stored in the memory unit 304, the instructions may specifically configure the processor 302 to perform one or more algorithms and operations described herein.

Thus, the processor 302 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The memory unit 304 may include suitable logic, circuitry, and/or interfaces that are adapted to store a set of instructions that is executable by the processor 302 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory unit 304 may be integrated with the processor 302 on a single chip, without departing from the scope of the disclosure.

The communication interface 306 may correspond to an interface that may facilitate transmission and reception of messages and data to and from various components and/or devices. In some example embodiments, through the communication interface 306, the antennas 106 of the RFID system 102 may be configured to communicate signals transmitted by the example implementation of the RFID readers 108. In some examples, through the communication interface 306, the antennas 106 may receive RF interrogation signals to interrogate the RFID tags 116 e.g., for tracking assets 112. Examples of the communication interface 306 may include, but are not limited to, an antenna, an Ethernet port, a USB port, a serial port, or any other port that can be adapted to receive and transmit data. In some example embodiments, the communication interface 306 can transmit and receive data and/or messages in accordance with the various communication protocols, such as, I2C, TCP/IP, UDP, and 3G, 4G, and/or 5G communication protocols. In some example embodiments, the communication interface 306 may include suitable logic and/or circuitry that may be configured to communicate with the one or more components of the antennas 106, in accordance with one or more device communication protocols such as, but not limited to, I2C communication protocol, Serial Peripheral Interface (SPI) communication protocol, Serial communication protocol, Control Area Network (CAN) communication protocol, and 1-Wire® communication protocol.

In some example embodiments, the example implementation of the RFID readers 108 may include a signal processing unit (not shown) that may include suitable logic and/or circuitry for analyzing input signals received from one or more components. For example, the signal processing unit may include a digital signal processor that may be configured to identify peaks and valleys in the received signals. Further, the signal processing unit may utilize one or more signal processing techniques such as, but not limited to, Fast Fourier Transform (FFT), Discrete Fourier Transform (DFT), Discrete Time Fourier Transform (DTFT) to analyze the received signals. In some examples, the signal processing unit may be implemented using one or more hardware components, such as, but not limited to, FPGA, ASIC, and the like.

In accordance with some example embodiments, the first antenna element 312 and the second antenna element 314 of the example implementation of the RFID readers 108 may be configured to transmit/receive data by utilizing one or more of EPC global communication standards or DOD communication standards. In some example embodiments, the example implementation of the RFID readers 108 may include the RFID reader unit 308 that may comprise one or more of filters, analog to digital (A/D) converters, Digital to Analog (D/A) convertors, matching circuits, amplifiers, and/or tuners that can enable the RFID reader unit 308 to transmit interrogation commands for interrogating RFID tags 116. Further, the RFID reader unit 308 may be configured to receive data over the one or more frequency bands through the first antenna element 312 and the second antenna element 314. In some example embodiments, the RFID reader unit 308 may be implemented using one or more of Application Specific Integrated Circuit (ASIC) and Field Programmable Gate Array (FPGA).

According to some example embodiments described herein, the example implementation of the RFID readers 108 can be configured to search (e.g. interrogate) for an RFID tag 116. As described earlier, the RFID tag 116 can be associated with the asset 112. Further, the RFID tag can be interrogated by the example implementation of the RFID readers 108 for tracking the asset 112 in the environment 100.

According to some example embodiments described herein, the processor 302 of the example implementation of the RFID readers 108 can be configured to manipulate a transmit power at which the example implementation of the RFID readers 108 can be configured to operate the antennas 106. In other words, field strength at which the antennas 106 are operated by the example implementation of the RFID readers 108 can be varied or manipulated based on varying the transmitter output power of the example implementation of the RFID readers 108 coupled to the antenna. In some example embodiments, the processor 302 may be configured to initiate a binomial search operation to locate an antenna (i.e. from amongst the antennas 106) that can be closest to the asset 112 to which the specific RFID tag is attached. In this regard, in some examples, the processor 302 may vary (e.g. increase or decrease) the transmit power of the example implementation of the RFID readers 108 while searching for a specific RFID tag, details of which are described hereinafter.

According to some example embodiments, the processor 302 may be configured to execute RF transmission by the example implementation of the RFID readers 108 within a power range, e.g. a maximum power level and a minimum power level, so as to vary the field strength at which the antennas 106 can be operated. In some examples, the maximum power level and the minimum power level may be user-defined. In an example embodiment, the processor 302 may initiate sending RF interrogation signals to search the RFID tags by sequentially powering one or more antenna from amongst the antennas 106 (i.e. array of antennas). In this regard, the RFID reader may power each antenna of the array of antennas 106, one after another (i.e. one at a time), to interrogate the RFID tags. In some example embodiments, the example implementation of the RFID readers 108 may be configured initially to operate the antennas 106 at the maximum power level and may further gradually decrease the power level at which the antennas 106 are operated.

In an example embodiment, the example implementation of the RFID readers 108 may execute the binomial search operation by initiating an identification of the RFID tag by operating the example implementation of the RFID readers 108 at the maximum power level. To this end, in some examples, if the RFID tag is identified by an antenna of the array of antennas 106, then the processor 302 reduces the power level at which the example implementation of the RFID readers 108 operates the antennas 106. In this regard, an identification of the RFID tag can be determined based on a signal (e.g., an acknowledgement) received at the antenna 106 in response to the interrogation command sent to the RFID tag. Further, at the reduced power level, the example implementation of the RFID readers 108 again operates the antennas 106 and interrogates the RFID tag. In this fashion, the processor 302 can sequentially power each antenna of the antennas 106 at a maximum or full power level and can gradually decrease the power until the RFID tag is not identified by any of the antennas. Furthermore, the processor 302 can identify the antenna which last read or identified the RFID tag before the transmit power at which the example implementation of the RFID readers 108 operates the antennas 106 is reduced to a value at which no RFID tag was identified. Furthermore, the processor 302 can utilize the identified antenna to identify the RFID tag and approximate the location of the asset to which the RFID tag is attached.

In some examples, in response to identification of the RFID tag, the processor 302 can be configured to reduce the power level at which the antennas 106 are operated based on following equation (i.e. Equation 1):

$$\text{Next Power Level} = \text{Current power} - ((\text{Current power setting} - \text{minimum power setting})/2)$$

Accordingly, the processor 302 can repeat reducing the transmit power level at which the antenna 106 is operated using the Equation 1, until the RFID tag is not identified. However, in an instance, when the example implementation of the RFID readers 108 fails to find the RFID tag, the processor 302 can increase the transmit power level. In this regard, the processor 302 can compute a next power level at which the example implementation of the RFID readers 108 operates the antenna 106 based on below equation (i.e. Equation 2):

$$\text{Next Power Level} = \text{Current power} + ((\text{Previous power setting} - \text{current power setting})/2)$$

Accordingly, in some example embodiments, the processor 302 can continue alternating the transmit power levels between decreasing power and increasing power until it runs out of power levels, to identify the RFID tags. An example operation of the RFID system 102 to identify the RFID tag is described in following paragraphs.

In an example embodiment, the example implementation of the RFID readers 108 can be configured to operate at a maximum power level of 30 dB and a minimum power level of 20 dB. In this regard, at step 1, the processor 302 can configure the example implementation of the RFID readers 108 to operate at the maximum power level i.e. 30 dB and send interrogation command to read the RFID tag. At step 2, if the RFID tag is identified, the processor 302 can determine a next power setting as 5 dB (i.e. (30–20)/2) and a next power level as 25 dB (i.e. 30–5). Further, at step 3, the processor 302 can configure the example implementation of the RFID readers 108 to operate at the next power level i.e. 25 dB. At step 4, if the RFID tag is identified, the processor 302 can again reduce the transmit power level by determine the next power level based on the Equation 1, as described earlier. In this regard, the processor 302 can determine the next power level as 22 dB (i.e. (25–20)/2=2.5 (round down or up) which can be round down to 2 db; next power level=20+2=22 db). Further, at step 5, if the RFID tag is not identified, the processor 302 can increase the transmit power level. In this regard, the processor 302 can determine a next power level based on the Equation 2, as described earlier. Accordingly, at step 5, the processor 302 can determine a next power level to be 28 dB (i.e. (30–25)/2=2.5 (round up or down) for this example round down to 2 db; (30 dB-2 dB)=28 Db. Further, the process of increasing and/or decreasing the transmit power level can be repeated until, an antenna which last read the RFID tag (before no RFID tag identification) is identified. Furthermore, the processor 302 can use the identified antenna to locate the RFID tag.

According to some example embodiments, the processor 302 may be configured to compute a confidence score corresponding to each antenna of the array of antennas 106. In this regard, the processor 302 can utilize the confidence score to identify the antenna closest to the RFID tag searched by the example implementation of the RFID readers 108. Further, the processor 302 can identify the RFID tag searched by the example implementation of the RFID readers 108 based on the antenna identified using the confidence score. In an example embodiment, the processor 302 can be configured to sequentially power each antenna at maximum power over various frequency channels. In this regard, the frequency channels can be selected by the processor 302 based on a predefined rule. In some examples, the predefined rule includes use of frequency dwell time associated with each antenna. In some examples, a frequency hopping time (i.e. a time to hop to a next frequency channel) can be modified based on the frequency dwell time associated with the antenna. Further, processor 302 can be configured to repeat steps of the sequential powering of the antennas based on decreasing the transmit power level over the various frequency channel. According to said example embodiment, the processor 302 can record a number of RFID tag reads received by each antenna at various power levels and various frequency channels (the number of tag reads at each frequency and/or power level representing a sub-count of the number of tag reads in total). In this regard, in some example embodiments, the processor 302 can utilize a read signal received at the antenna and/or the example implementation of the RFID readers 108, in response to the interrogation command, to determine an identifier of the RFID tag and increase a count for that RFID tag and for that antenna. Further, the processor 302 can compute the confidence score by adding a weightage parameter to the number of RFID tag reads at each antenna. The weightage parameter can be based on a transmit power intensity associated with the example implementation of the RFID readers 108. Furthermore, the processor 302 can utilize the confidence score to determine an approximate location of the RFID tag searched by the example implementation of the RFID readers 108. Following paragraph describes an example illustration of computation of the confidence score by the processor 302 of the example implementation of the RFID readers 108 to locate the RFID tag.

In an example, the processor 302 may compute a confidence score of each antenna based on below equation:

$$\text{Confidence for each antenna} = (p1*N20 \text{ dBm}) + (p2*N15 \text{ dBm}) + (p3*N10 \text{ dBm})$$

Here p1, p2, p3 each represent a weightage parameter applicable according to a transmit power level selected for a round of antenna operation. The weightage parameter is indicative of a weightage given to values (i.e. number of RFID tag reads) recorded at the respective antenna. For instance, p1 represents a first weightage parameter applicable for a first transmit power level of 20 dBm, p2 represents a second weightage parameter applicable for a second transmit power level of 15 dBm, and p3 represents a third weightage parameter applicable for a third transmit power level of 10 dBm. In some example embodiments, the weightage parameter can be inversely proportional to the transmit power level. In an example, the first weightage parameter p1 can be 1, the second weightage parameter p2 can be 2, and the third weightage parameter p3 can be 3. Further, N20 dBm represents a number of RFID tag reads recorded at the antenna when the antenna is operated at the transmit power level 20 dBm of the example implementation of the RFID readers 108. Similarly, N15 dBm represents a number of RFID tag reads received at the antenna when the antenna is operated at the transmit power level 15 dBm of the example implementation of the RFID readers 108. Below table illustrates an example of number of RFID tag reads received at a first antenna (i.e. Antenna 1) and a second antenna (i.e. Antenna 2) from amongst the array of antennas 106 at varying transmit power level and various frequency channels:

| Power | Frequency | Antenna 1 | Antenna 2 |
|-------|-----------|-----------|-----------|
| 20 dBm | $f_1$ | 1 | 1 |
| | $f_{15}$ | 1 | 1 |
| | $f_3$ | 0 | 1 |
| 15 dBm | $f_{12}$ | 1 | 1 |
| | $f_{21}$ | 1 | 1 |
| | $f_{16}$ | 1 | 0 |
| 10 dBm | $f_{30}$ | 1 | 0 |
| | $f_{42}$ | 0 | 0 |
| | $f_{23}$ | 1 | 1 |

Here frequency f1, f15, f3, f12 . . . f23 can be randomly determined by the processor 302 based on the predefined rule. In the above example, the processor 302 may compute the confidence score of the antennas as stated below:

Confidence score for Antenna $1=(1*2)+(2*3)+(3*2)$
    $=14$

Confidence score for Antenna $2=(1*3)+(2*2)+(3*1)$
    $=10$

As the confidence score of Antenna 1 is greater than the confidence score of Antenna 2, the processor 302 may accordingly identify the Antenna 1 to be closest to the RFID tag searched by the RFID readers 108.

By way of implementation of the example embodiment described herein, the example implementation of the RFID readers 108 may effectively locate a desired RFID tag in a confined area. In this aspect, by utilizing spatial, frequency and temporal diversity in combination and performing weighted data analysis to compute the confidence score of each antenna, as described earlier, RFID tags attached to assets can be accurately tracked even in presence of reflections and noise due to metallic surfaces in the environment.

According to an example embodiment, the example implementation of the RFID readers 108 can be configured to keep a track of a time spent on a frequency channel when a radio transmitter of the example implementation of the RFID readers 108 is turned ON. Further, in some example embodiments, the processor 302 of the example implementation of the RFID readers 108 can be configured to automatically switch to a new frequency channel based on the pre-defined rule to operate the antenna over the new frequency channel. In some examples, the new frequency channel can be identified based on a pseudorandom sequence if the time monitored by the processor 302 exceeds a frequency dwell time. In some example embodiments, the processor 302 may also switch to power a next antenna if the frequency dwell time associated with a previous antenna is exceeded.

Figure 4:
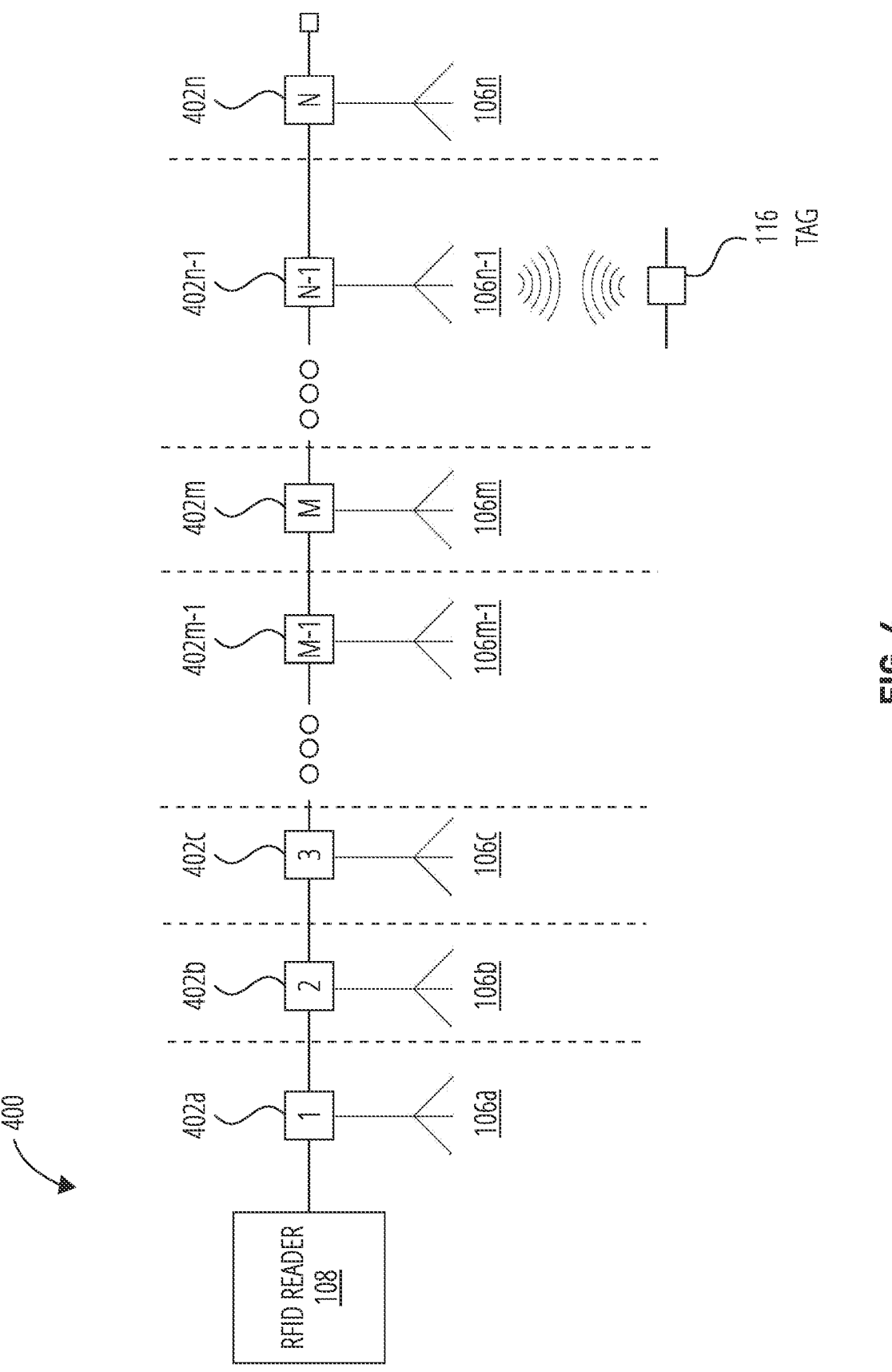
FIG. 4 illustrates an RFID system comprising an RFID reader and a plurality of antennas in a distributed antenna network, according to one or more example embodiments described herein.

FIG. 4 illustrates an RFID system 400 comprising the example implementation of the RFID readers 108 and a plurality of antennas (106) in a distributed antenna network, according to one or more example embodiments described herein. As illustrated, each antenna of the plurality of antennas can be communicatively coupled to the example implementation of the RFID readers 108. In some examples, the RFID system 102 may include smart switches (402a, 402b, 402c . . . 402n) that can be controlled using RF signals by the example implementation of the RFID readers 108. The smart switches (402a, 402b, 402c . . . 402n) can connect the example implementation of the RFID readers 108 via the coaxial cable to the antennas 106. In some example embodiments, the smart switches can be configured for both transmitting RF signals and control signals to the antennas 106 connected over the coaxial cable. In some example embodiments, the example implementation of the RFID readers 108 can be configured to selectively switch one or more of the smart switches (402a, 402b, 402c . . . 402n) to connect the example implementation of the RFID readers 108 with an antenna connected with the selected switch. Accordingly, the example implementation of the RFID readers 108 can communicate with the RFID tag 116 using RF signals and obtain data from the RFID tag 116.

In some example embodiments, each of the smart switches can include a switching element, such as a switch, more particularly an RF switch that can be controllable to switch between two output states. In an example embodiment, the smart switch can include an RF coupler, an RF switch, and a RF Integrated circuit (IC). In an example, the RFID IC of the smart switch can be an EM4325 Gen 2 IC with a Serial Peripheral Interface (SPI) that outputs signal to switch the RF switch. In an example, the RF switch can be a pseudomorphic high-electron-mobility transistor (pHEMT) gallium arsenide (GaAs) switch. In this regard, in an example operation of the switch, control signals may be transmitted to the switch and received by the RFID IC, such that the RFID IC operates as an RF front end and protocol handler for communication with one or more RFID tags 116 described herein. Thus, this configuration allows for the smart switches (402a, 402b, 402c . . . 402n) to be switched between a connected and through states, such that an antenna coupled with a connected switch can be activated, thereby allowing communication (e.g., communication with one or RFID tags using RFID communication protocols). According to some example embodiments, the distributed antenna system as described herein, can be implemented based on techniques as described in U.S. patent application Ser. No. 15/288,182, entitled, "Systems and methods for controlling antennas", filed 7 Oct. 2016, details of which are incorporated herein by reference.

In some example embodiments, the distributed antenna system may include the antennas 106 arranged in an array so as to cover a defined area (e.g. columns) that may contain the assets 112 (e.g. packages/boxes). In some example embodiments, each antenna of the distributed antenna network may be installed over a defined area of an environment. For instance, in some examples, in a warehouse or inventory storage environment, each antenna of may be installed over a respective column (A, B, C . . . N) of a storage location of the warehouse. Further, each antenna may be configured to communicate interrogation signals received from the example implementation of the RFID readers 108 to interrogate an RFID tag 116 that can be associated with the asset 112 located in the respective column.

Figure 5:
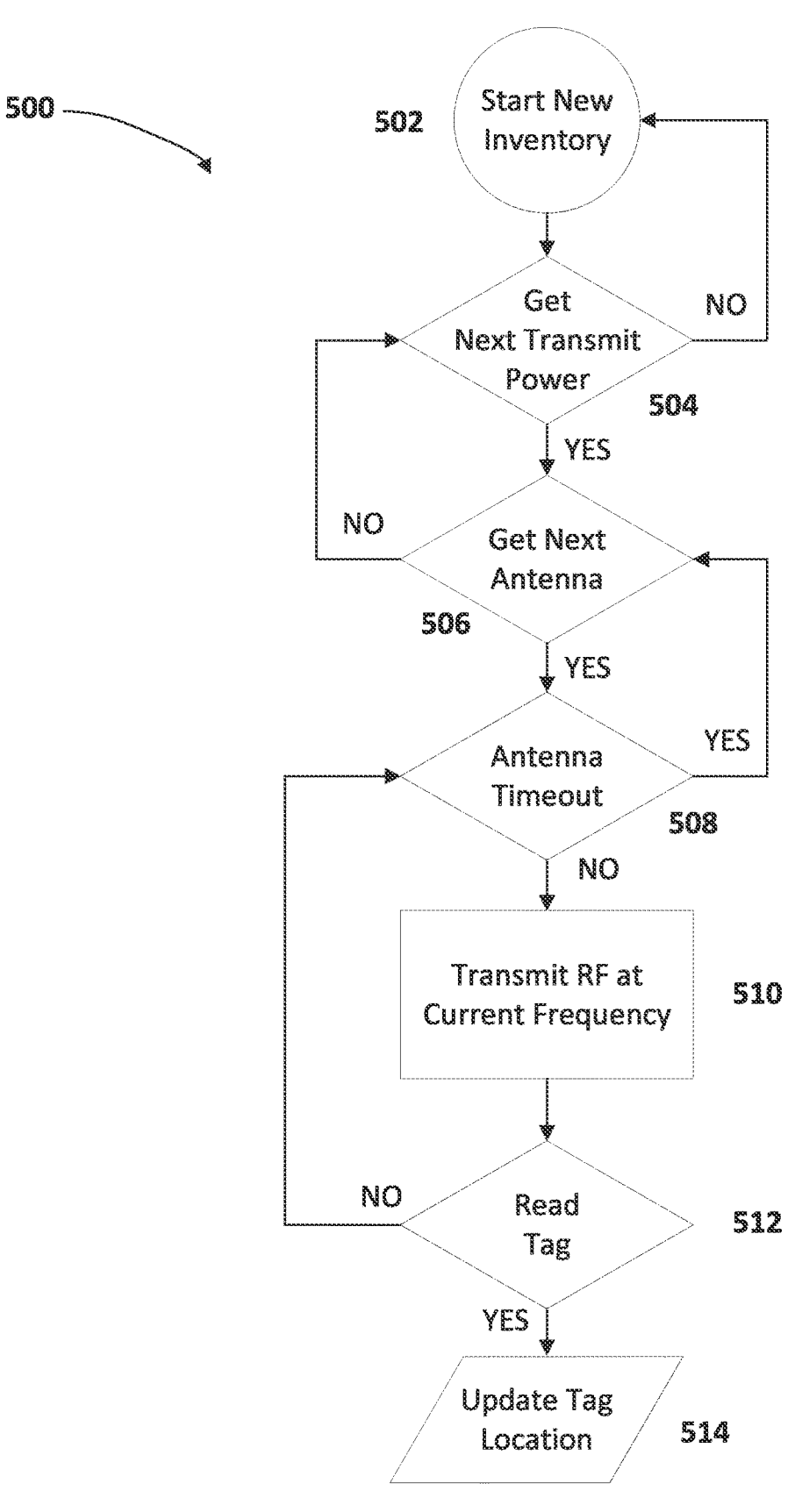
FIG. 5 illustrates an example flowchart representing a method of identifying an RFID tag, in accordance with some example embodiments described herein.

FIG. 5 illustrates an example flowchart representing a method 500 of identifying an RFID tag, in accordance with some example embodiments described herein.

In accordance with various example embodiments described herein, it will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for the implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block (s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIG. 5, when executed, convert the computer or processing circuitry into a particular machine configured to perform an example embodiment of the present invention. Accordingly, the operations of FIG. 5 can define an algorithm for configuring a computer or processor, to perform an example embodiment. In some cases, a general-purpose computer may be provided with an instance of the processor which performs the algorithm of FIG. 5 to transform the general-purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

The method 500 starts at step 502. At step 502, the RFID system 102 may include means such as, the processor 302 of the RFID reader to start a new inventory search. In this regard, the processor 302 may initiate sending of an interrogation command (e.g. RF Tag interrogation signals) to interrogate an RF tag. As described earlier, the RF tag may be associated with an asset stored in the inventory, which is to be searched by the example implementation of the RFID readers 108. In an example embodiment, the example implementation of the RFID readers 108 may be operated at a maximum transmit power level or a predefined transmit power level to initiate the inventory search. Further, in some examples, the processor 302 may operate the antennas at the maximum or predefined transmit power level. Further, as described earlier, the processor 302 may identify one or more antennas from amongst the array of antennas which received an acknowledgement from the RF tag in response to the interrogation command.

At step 504, the processor 302 may check for getting (i.e. determining) a next power level. In this aspect, as described earlier, in some example embodiments, the processor 302 of the example implementation of the RFID readers 108 may be configured to increase or decrease a transmit power level at which the example implementation of the RFID readers 108 operates the antennas 106. Accordingly, at step 504, the processor 302 may identify a next power level (e.g. by using the Equation 1 or the Equation 2, as described earlier) to operate the antennas 106 by the example implementation of the RFID readers 108. In an instance, if the processor 302 gets a next power level, the method 500 can move to step 506. Alternatively, if the processor 302 fails to get a next power level (e.g. a minimum or maximum transmit power level is reached) the method 500 can move back to step 502 at which the processor 302 initiates a search for a next inventory (i.e. a next RF tag).

At step 506, the processor 302 can operate one or more antennas of the array of antennas 106 at the transmit power level identified at the step 504. In this regard, in an instance, when each antenna of the array of antenna is operated at the transmit power level identified at step 504, and the processor 302 can identify a next transmit power level at step 504. Otherwise, the processor 302 can continue to power each antenna until an antenna timeout is reached at step 508. As described earlier, to operate the antennas 106, the processor 302 can sequentially power each antenna of the array of antennas 106 using the transmit power level identified at step 504.

According to some example embodiments described herein, the processor 302 can identify the antenna time out at step 508, based on using a frequency dwell time associated with each antenna. In this regard, each antenna of the array of antennas 106 can be configured to be operated within a frequency range related to the frequency dwell time. In other words, as described earlier, the processor 302 can keep a track of a time that is spent on a frequency when a radio transmitter of the example implementation of the RFID readers 108 is turned ON (i.e. a time during which the example implementation of the RFID readers 108 operates the antennas 106). Further, the processor 302 can be configured to automatically switch to a new frequency channel based on a pseudorandom sequence (e.g. if the time exceeds a frequency dwell time associated with the respective antenna 106).

Accordingly, at step 508, if the processor 302 identifies the antenna time out, the method 500 moves back to the step 506 at which the processor 302 identifies a next antenna that can be powered by the example implementation of the RFID readers 108. However, if the antenna time out is not reached, the method 500 moves to step 510 at which the processor 302 can cause the example implementation of the RFID readers 108 to transmit RF signals (i.e. interrogation command) at a current frequency identified based on the predefined rule. Further, at step 512, the processor 302 determines if an RFID tag is read (i.e. an acknowledgement signal is received at the antenna in response to the interrogation command). In this regard, if the RFID tag is not read at step 512, the processor 302 operates a next antenna at a same transmit power level and/or based on a different frequency channel. Otherwise, in response to reading of the RF tag at step 512, the processor 302 updates a tag location by identifying the antenna at which the RF tag is read. In other words, at step 514, the processor 302 records and/or updates a count of RF tag read by the antenna when the antenna is operated at a current frequency channel and a current transmit power. It should be appreciated that the described process for updating the tag location may be repeated any number of times, for example to track movement of the RFID tag as it transverses within a particular environment (e.g., a warehouse) over time.

In some example embodiments, identification of the RF tag associated with the asset can include identification of a location of the antenna closest to the RF tag. In this regard, the processor 302 can calculate the location of the antenna based on the transmit power and frequency on the antenna that is used to read the tag. Further, as described earlier, in some examples, the location can also be computed based on estimating a confidence score based on the number of times the tag is read on an antenna and weights associated with the power and/or the frequency used. In some embodiments, each frequency channel is associated with a particular weightage parameter, and/or each power transmit level is associated with a particular weightage parameter. In other example embodiments, upon identifying the location of the antenna, a location of the RF tag can also be determined based on triangulation techniques e.g. triangulating the RF tag based on the signals received from the tag by the antennas 106 in the array.

In some example embodiments, one or more antennas of the array of antennas 106 can be associated with an indicator element (e.g. a light indicator, a sound indicator, etc.) which can be actuated in response to identification of the antenna by the processor 302. In other words, in some example embodiments, an indicator associated with the antenna can be actuated to indicate which antenna is closest to the RF tag being searched by the example implementation of the RFID readers 108.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor 302 may be any processor, controller, or state machine. A processor 302 may also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor 302-readable media. These instructions may be embodied by one or more processor 302-executable software modules that reside on the one or more non-transitory computer-readable or processor 302-readable storage media. Non-transitory computer-readable or processor 302-readable storage media may in this regard comprise any storage media that may be accessed by a computer or a processor 302. By way of example but not limitation, such non-transitory computer-readable or processor 302-readable media may include RAM, ROM, EEPROM, FLASH memory, disk storage, magnetic storage devices, or the like. Disk storage, as used herein, includes compact disc (CD), laser disc, optical disc, digital versatile disc (DVD), floppy disk, and Blu-Ray Disc™ or other storage devices that store data magnetically or optically with lasers. Combinations of the above types of media are also included within the scope of the terms non-transitory computer-readable and processor 302-readable media. Additionally, any combination of instructions stored on the one or more non-transitory processor 302-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. An apparatus comprising at least one processor and at least one memory having computer-coded instructions stored thereon that, in execution via the at least one processor, configure the apparatus to:

initiate an interrogation command associated with a RFID tag;

in response, identify a count of tag reads associated with each antenna of a plurality of antennas associated with the RFID tag based on at least one of a plurality of transmit power levels or a plurality of frequency channels;

generate a plurality of confidence scores comprising a confidence score for each antenna based at least in part on the count of tag reads associated with each antenna; and determine a tag location associated with the RFID tag based at least in part on the plurality of confidence scores.

2. The apparatus according to claim 1, wherein the apparatus is configured to cause activation of the plurality of antennas at the plurality of transmit power levels.

3. The apparatus according to claim 1, wherein to cause activation of the plurality of antennas at the plurality of transmit power levels, the apparatus is configured to sequentially activate the plurality of antennas at the plurality of transmit power levels.

4. The apparatus according to claim 2, wherein to cause activation of the plurality of antennas at the plurality of transmit power levels, the apparatus is configured to:
   activate each antenna of the plurality of antennas with a particular power level to a maximum transmit power level of the plurality of transmit power levels; and
   incrementally decrease the particular power level of each antenna of the plurality of antennas until the particular power level reaches a minimum power level of the plurality of transmit power levels.

5. The apparatus according to claim 2, wherein to cause activation of the plurality of antennas at the plurality of transmit power levels, the apparatus is configured to:
   activate each antenna of the plurality of antennas with a particular power level to a minimum transmit power level of the plurality of transmit power levels; and
   incrementally increase the particular power level of each antenna of the plurality of antennas until the particular power level reaches a maximum power level of the plurality of transmit power levels.

6. The apparatus according to claim 2, wherein to cause activation of the plurality of antennas at the plurality of transmit power levels, the apparatus is configured to:
   activate the plurality of antennas according to a binomial search operation.

7. The apparatus according to claim 1, wherein the apparatus is configured to cause activation of the plurality of antennas at the plurality of transmit power levels over the plurality of frequency channels.

8. The apparatus according to claim 7, wherein the apparatus is further configured to:
   select the plurality of frequency channels based on a set of frequency dwell times associated with the plurality of antennas.

9. The apparatus according to claim 1, wherein to generate the confidence score for a particular antenna of the plurality of antennas, the apparatus is configured to:
   determine a plurality of weightage parameters comprising a weightage parameter corresponding to each transmit power level of the plurality of transmit power levels; and
   generate a plurality of values corresponding to the plurality of transmit power levels, wherein the plurality of values comprises a value generated for each particular transmit power level of the plurality of transmit power levels based at least in part on:
      a sub-count of tag reads associated with the antenna at the transmit power level and each frequency channel of the plurality of frequency channels, and
      the weightage parameter corresponding to the particular transmit power level from the plurality of weightage parameters; and
   calculate the confidence score from the plurality of values corresponding to the plurality of transmit power levels.

10. The apparatus according to claim 1, the apparatus further configured to:
   triangulate the RFID tag based at least in part on signals received in response to activation of the plurality of antennas.

11. A computer-implemented method comprising:
   initiating an interrogation command associated with a RFID tag;
   in response, identifying a count of tag reads associated with each antenna of a plurality of antennas associated with the RFID tag based on at least one of a plurality of transmit power levels or a plurality of frequency channels;
   generating a plurality of confidence scores comprising a confidence score for each antenna based at least in part on the count of tag reads associated with each antenna; and
   determining a tag location associated with the RFID tag based at least in part on the plurality of confidence scores.

12. The computer-implemented method according to claim 11, wherein the computer-implemented method comprising causing activation of the plurality of antennas at the plurality of transmit power levels.

13. The computer-implemented method according to claim 12, wherein causing activation of the plurality of antennas at the plurality of transmit power levels comprises activating each antenna of the plurality of antennas with a particular power level to a maximum transmit power level of the plurality of transmit power levels; and
   incrementally decreasing the particular power level of each antenna of the plurality of antennas until the particular power level reaches a minimum power level of the plurality of transmit power levels.

14. The computer-implemented method according to claim 12, wherein causing activation of the plurality of antennas at the plurality of transmit power levels comprises:
   activating each antenna of the plurality of antennas with a particular power level to a minimum transmit power level of the plurality of transmit power levels; and
   incrementally increasing the particular power level of each antenna of the plurality of antennas until the particular power level reaches a maximum power level of the plurality of transmit power levels.

15. The computer-implemented method according to claim 12, wherein causing activation of the plurality of antennas at the plurality of transmit power levels comprises:
   activating the plurality of antennas according to a binomial search operation.

16. The computer-implemented method according to claim 11, wherein the plurality of antennas are activated at the plurality of transmit power levels over the plurality of frequency channels.

17. The computer-implemented method according to claim 15, the computer-implemented method further comprising:
   selecting the plurality of frequency channels based on a set of frequency dwell times associated with the plurality of antennas.

18. The computer-implemented method according to claim 11, wherein generating the confidence score for a particular antenna of the plurality of antennas comprises:
   determining a plurality of weightage parameters comprising a weightage parameter corresponding to each transmit power level of the plurality of transmit power levels; and
   generating a plurality of values corresponding to the plurality of transmit power levels, wherein the plurality of values comprises a value generated for each particular transmit power level of the plurality of transmit power levels based at least in part on:
      a count tag reads associated with the antenna at the transmit power level and each frequency channel of the plurality of frequency channels, and
      the weightage parameter corresponding to the particular transmit power level from the plurality of weightage parameters; and calculating the confidence score from the plurality of values corresponding to the plurality of transmit power levels.

19. A computer program product comprising at least one non-transitory computer-readable storage medium having computer program code stored thereon that, in execution with at least one processor, configures the computer program product for:

initiating an interrogation command associated with a RFID tag;

in response, identifying a count of tag reads associated with each antenna of a plurality of antennas associated with the RFID tag based on at least one of a plurality of transmit power levels or a plurality of frequency channels;

generating a plurality of confidence scores comprising a confidence score for each antenna based at least in part on the count of tag reads associated with each antenna; and determining a tag location associated with the RFID tag based at least in part on the plurality of confidence scores.

20. The computer program product according to claim 19, wherein generating the confidence score for a particular antenna of the plurality of antennas comprises:

determining a plurality of weightage parameters comprising a weightage parameter corresponding to each transmit power level of the plurality of transmit power levels; and generating a plurality of values corresponding to the plurality of transmit power levels, wherein the plurality of values comprises a value generated for each particular transmit power level of the plurality of transmit power levels based at least in part on:

a count tag reads associated with the antenna at the transmit power level and each frequency channel of the plurality of frequency channels, and the weightage parameter corresponding to the particular transmit power level from the plurality of weightage parameters; and calculating the confidence score from the plurality of values corresponding to the plurality of transmit power levels.

* * * * *